United States Patent [19]
Huang et al.

[11] 3,855,342
[45] Dec. 17, 1974

[54] ISOPARAFFIN-OLEFIN ALKYLATION WITH A COMPLEX OF A MACRORETICULAR ACID CATION EXCHANGE RESIN AND $BF_3$

[75] Inventors: Tracy J. Huang, Trenton, N.J.; Sergei Yurchak, Washington Crossing, Pa.

[73] Assignee: Mobil Oil Corporation, New York, N.Y.

[22] Filed: Oct. 25, 1973

[21] Appl. No.: 409,563

[52] U.S. Cl. .......................... 260/683.44, 252/433
[51] Int. Cl. ............................................ C07c 3/56
[58] Field of Search ........................... 260/683.44

[56] References Cited
UNITED STATES PATENTS
2,843,642   7/1958   Kelly ........................... 260/683.44

Primary Examiner—Delbert E. Gantz
Attorney, Agent, or Firm—Andrew L. Gaboriault; Raymond W. Barclay

[57] ABSTRACT

This invention relates to a process for effecting alkylation of an isoparaffin with an olefin in the presence of a catalyst comprising a macroreticular acid cation exchange resin characterized by a surface acid concentration of less than about 0.5 milliequivalents of hydrogen ion per square meter surface area and boron trifluoride, the latter being present in an amount in excess of that required to saturate said resin.

20 Claims, 9 Drawing Figures

Selectivity of TMP in $C_5^+$ and $C_8$ vs. Surface Area of Resin

RON Clear of $C_5^+$ Alkylate vs. Surface Area of Resin

ISOPARAFFIN-OLEFIN ALKYLATION WITH A COMPLEX OF A MACRORETICULAR ACID CATION EXCHANGE RESIN AND BF₃

BACKGROUND OF THE INVENTION

1. Field of the Invention

This invention pertains to a process for alkylation by reaction of an isoparaffin and an olefin.

2. Description of the Prior Art

Alkylation achieved as a result of reaction between an isoparaffin and an olefin has heretofore been recognized as resulting in an alkylate product useful as a high octane blending stock in gasoline.

Sulfuric acid and HF alkylation processes have been used for the production of such alkylate. These processes employ liquid-liquid catalytic systems which are known to be expensive and troublesome because of such problems as maintaining an acid/hydrocarbon emulsion, product separation and waste disposal.

In order to overcome such problems, attempts have been made in the past to conduct the desired alkylation in a heterogeneous catalyst system. One such attempt described in U.S. Pat. No. 3,251,902 has involved the use of crystalline aluminosilicate zeolites as catalysts. While certain of such crystalline aluminosilicate zeolites have been found to be effective catalysts for isoparaffin/olefin alkylation, they have the disadvantage of aging rapidly and requiring frequent regeneration to maintain requisite selectivity.

Another approach which has been suggested in the past is the use as a catalyst for effecting the desired isoparaffin/olefin alkylation of a complex of a microreticular or gel type ion exchange resin and boron trifluoride. The use of such complex, although suggested almost 20 years ago, see for example U.S. Pat. No. 2,843,642, has not been adopted on a commercial scale due to side formation of unwanted olefinic products and relatively low selectivity for the desired branched alkylate product.

BRIEF DESCRIPTION OF DRAWINGS

The invention is described in conjunction with the accompanying drawings in which.

SUMMARY OF THE INVENTION

In accordance with the present invention, there is provided an isoparaffin/olefin alkylation process which overcomes many of the disadvantages of those previously employed and/or suggested. The method described herein, in contrast to that of U.S. Pat. No. 2,843,642, utilizes a catalyst which is a complex of a macroreticular acid cation exchange resin and boron trifluoride. The particular class of macroreticular acid cation exchange resins employed are characterized by substantial porosity, high surface area and a low surface acid concentration, generally less than about 0.5 milliequivalents of hydrogen ion per square meter surface area. For effecting the desired alkylation, the cation exchange resin should contain a small amount of water, generally between 0.5 and 20 percent by weight. The use of such catalyst has been found to unexpectedly result in an attractive yield of alkylate product of high octane number.

The macroreticular resins utilized in the process of this invention are characterized by the presence of acid functional groups and a structure having a high degree of true porosity while possessing rigidity and being subject to minimum volume change when immersed or removed from solvents or solutions.

The macroreticular acid ion exchange resin employed is typified by the presence of sulfonic acid groups, e.g., the sulfonated styrene-divinylbenzene copolymer exchange resins such as those commercially available as Amberlyst-15, Amberlyst XN-1005, Amberlyst XN-1010, Amberlyst XN-1011, Amberlyst XN-1008 and Amberlite 200. The properties of these resins, along with Amberlite IR-120H, a typical microreticular resin are shown below:

| Resin | Macroreticular | | | | | | Microreticular |
|---|---|---|---|---|---|---|---|
| | Amberlyst-15 | Amberlyst-XN-1005 | Amberlyst-XN-1010 | Amberlyst-XN-1011 | Amberlyst-XN-1008 | Amberlite-200 | Amberlite-IR-120H |
| Skeletal Structure | Styrene-DVB | do. | do. | do. | do. | do. | do. |
| Ionic Functionality | RSO₃H | do. | do. | do. | do. | do. | do. |
| Hydrogen Ion Concentration meq/g dry (Exchange Capacity) | 4.9 | 3.4 | 3.3 | 4.2 | 4.5 | 4.3 | 5.0 |
| Porosity, % | 32 | 42 | 47 | 24 | — | — | 1.8 |
| Avg. Pore Diameter, A° | 200–600 | 80–90 | 40–50 | — | 400–800 | — | — |
| Cross-linkage | ~20 | — | — | — | — | ~20 | 8 |
| Surface Area, m²/g dry | 40–50 | 100–200 | 550–600 | 28 | 30–40 | 40–50 | <0.1 |
| Surface Acid Concentration meq H⁺/m² S.A. | 0.102 | 0.031 | 0.006 | 0.150 | 0.129 | 0.096 | >50 |

Figure 1:
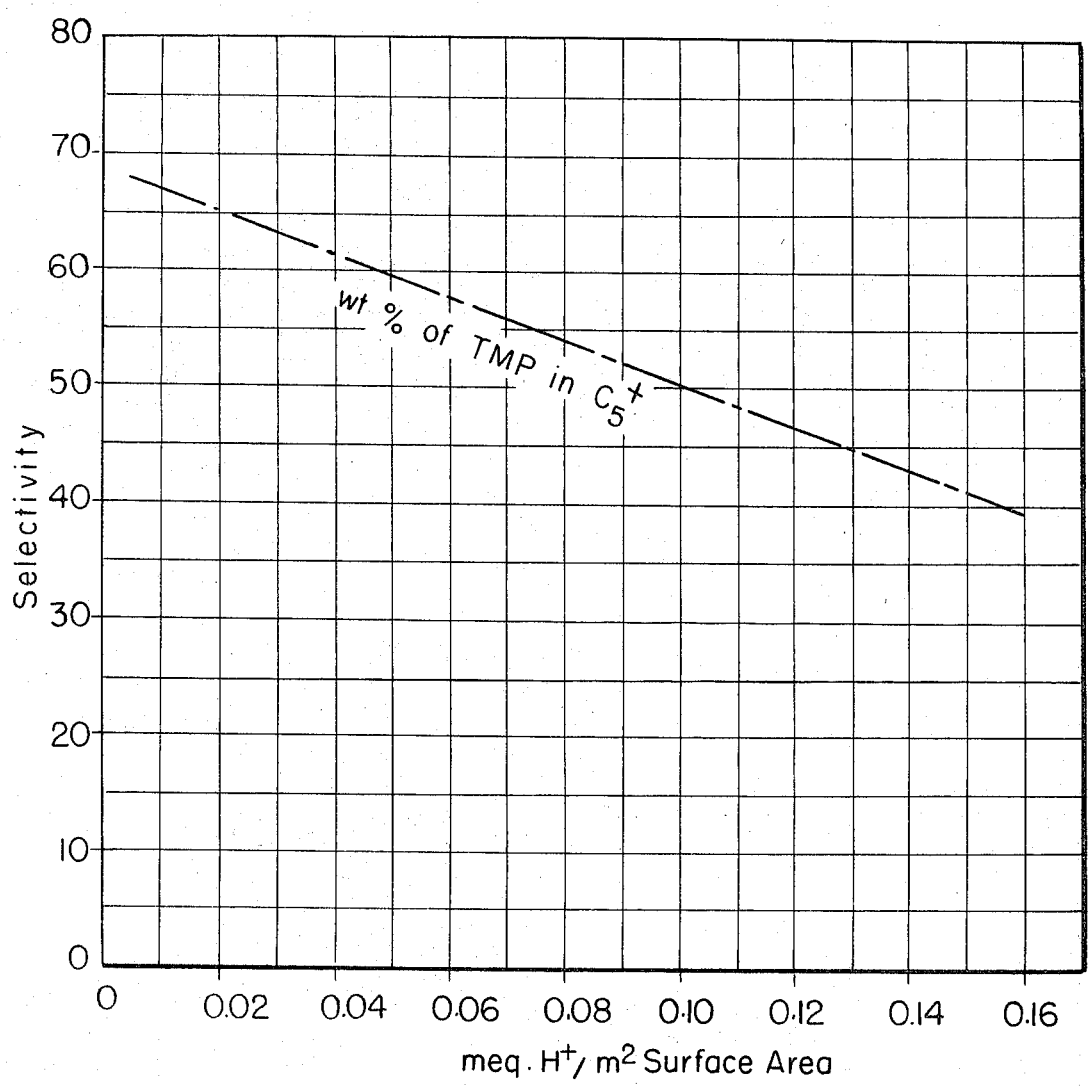
FIG. 1 depicts relationship between selectivity and resin surface acid concentration.

Surface acid concentration is determined by dividing the exchange capacity by the surface area in the dry state and is reported as milliequivalents of hydrogen ion per square meter surface area. The lower the surface acid concentration of the resin, the more effective is the resin/BF₃ catalyst for alkylation. The relationship between surface acid concentration of the resin in a resin/BF₃ catalyst and selectivity as determined as the weight percent of trimethylpentane in the C₅⁺ fraction for isobutane/butene-2-alkylation has been observed and is shown graphically in FIG. 1, from which it will be evident that the selectivity increases with decreasing resin surface acid concentration. In general, the surface acid concentration of the resin should be below about 0.5 milliequivalents of hydrogen ion per square meter surface area and preferably between about 0.001 and about 0.2 milliequivalents of hydrogen ion per square meter surface area.

The described resin and $BF_3$ form a complex. Neither $BF_3$ alone nor the resin alone is an effective catalyst for the desired isoparaffin/olefin alkylation. Likewise, the 1:1 complex (resin:$BF_3$) is also ineffective for alkylation. It has been found necessary that the amount of boron trifluoride present be in excess of that required to saturate the resin. Thus, effective macroreticular resin/$BF_3$ alkylation catalysts have been found to be generally characterized by an equivalent ratio of $BF_3$/acid groups of resin exceeding two.

The catalyst and more particularly the cation exchange resin component thereof used in accomplishing the desired alkylation is characterized by a water content of between about 0.5 and about 20 weight percent and preferably between about 1.5 and about 15 weight percent. Cation exchange resins having a water content of less than about 0.5 or greater than about 20 weight percent were not found effective in achieving alkylation. Water can be introduced into the resin by contact with the requisite quantity of liquid water or by exposure to a moisture laden atmosphere for a time sufficient to introduce the desired water content. One suitable way of introducing requisite water to the resin is by equilibrating it with air at 100 percent relative humidity for a controlled period of time.

Alkylation using the described catalyst is carried out at a temperature below that at which the resin decomposes, i.e., generally below 150°C. A temperature as low as −20°C. or lower may be employed. Generally the temperature, under practical operating conditions, will be within the approximate range of −20° to 60°C. A particularly effective temperature range is from about −20° to 20°C.

The pressure employed is sufficient to maintain the reactants in the liquid state. In general, the pressure will be between about 50 and about 1,500 psig and preferably between about 100 and 500 psig.

The isoparaffin reactant used in the present alkylation process is one having from 4 to 8 carbon atoms. Representative examples of such reactant are isobutane, 3 methylhexane, 2-methylbutane, 2,3-dimethylbutane and 2,4-dimethylhexane.

The olefin reactant employed contains from 2 to 12 carbon atoms. Representative examples are butene-2, isobutylene, butene-1, propylene, ethylene, hexene, octene and heptene. Particularly preferred is a $C_4$ olefin, i.e., butene-1, butene-2 or isobutylene either alone or in admixture.

The molar ratio of isoparaffin to olefin is generally between 2 and 50 and more particularly between about 3 and about 10. The weight ratio of resin to total hydrocarbon, that is isoparaffin, olefin and alkylate generally is between about 0.01 and about 0.5 and more particularly between about 0.04 and about 0.2.

The alkylation operation may be carried out either as a batch, semi-batch, continuous or semi-continuous operation. The time of reaction will be governed by the nature of the isoparaffin and olefin reactants employed, the ratio of such reactants, the temperature and pressure conditions utilized and the particular macroreticular resin/$BF_3$ catalyst used.

The reactants and the catalyst may be contacted in various ways. Thus, the isoparaffin and olefin reactants may be charged to the reactor as separate streams or they may be premixed before charging to the reactor. The catalyst likewise may be first mixed with the isoparaffin or olefin before introduction into the reactor. Desirably, however, preliminary contact between the catalyst and olefin reactant should be minimized to avoid olefin polymerization. The $BF_3$ component of the catalyst may be premixed with the isoparaffin reactant which is then introduced into the reactor with subsequent addition of the olefin reactant. The $BF_3$ may further be introduced into the reaction zone separately from the introduction of the isoparaffin and olefin reactants. The catalyst may be formed in situ by prior introduction of the macroreticular resin into the reactor followed by addition of $BF_3$.

As aforenoted, the desired alkylation may be carried out as a batch or semi-batch type operation. In the case of a batch operation, the isoparaffin and olefin reactants are charged to a closed reactor containing the catalyst, which is thereafter maintained at the desired temperature for the desired time. At the conclusion of the reaction, the hydrocarbon product mixture is withdrawn from the reactor and the alkylate product separated from unreacted materials and side products.

The alkylation process of this invention can also be carried out in continuous fashion, in which instance streams of the isoparaffin, the olefins and boron trifluoride are continuously charged to a reactor containing the macroreticular resin. The reactor is desirably stirred and maintained at the reaction temperature. The reaction mixture product is continuously withdrawn from the reactor, conducted to a vessel wherein $BF_3$ is removed as overhead and recycled to the reactor. The remaining product is conducted to a fractionator in which unreacted isoparaffin is removed as overhead and recycled to the reactor. The desired $C_5^+$ alkylate product is withdrawn as bottoms from the fractionator. This product boils in the pentane range and below the maximum temperature usable in gasoline. Generally, the gasoline end point is about 400°F. The alkylate product is usually characterized by a boiling range between that of isopentane and 400°F. A portion of the stream coming off the vessel from which $BF_3$ removed is conducted to a depropanizer, in which $C_3$ components are removed as overhead and heavier components, removed as bottoms, are recycled to the fractionator. Also, the isoparaffin reactant is suitably removed as a separate stream from the depropanizer and recycled to the reactor.

Figure 2:
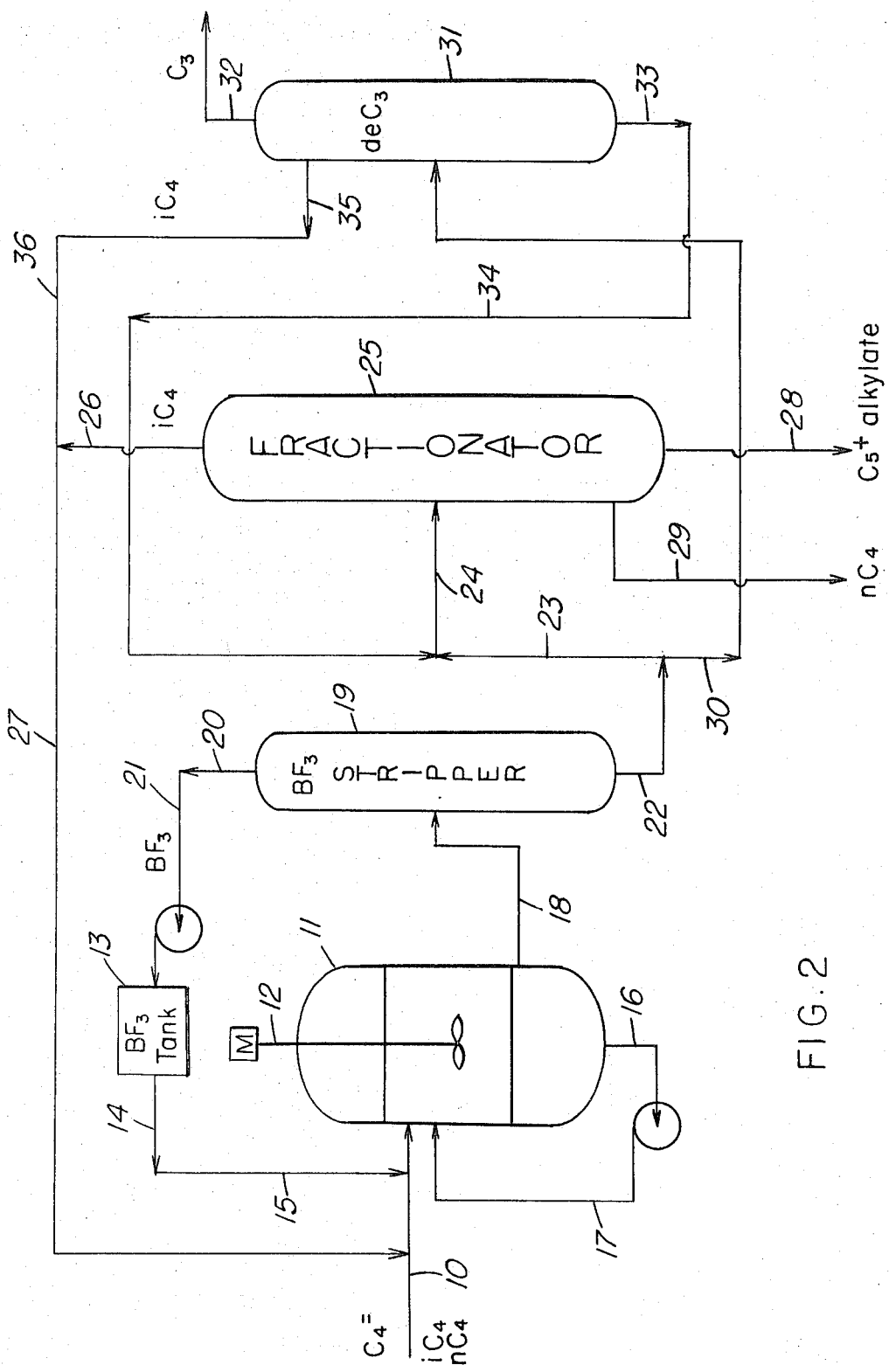
FIG. 2 illustrates a continuous mode of operation.

A suitable system for carrying out the continuous process is shown in FIG. 2. As will be realized, this described embodiment is schematic in that several items of processing equipment have been omitted for purposes of simplification. Turning to FIG. 2, a stream containing isobutane, butenes along with some normal butane is introduced through line 10 to reactor 11 provided with a stirrer 12. The macroreticular resin has previously been introduced into the reactor. $BF_3$ is introduced from tank 13 through lines 14 and 15 into the reactor. The amount of $BF_3$ introduced is such as to exceed that necessary to saturate the resin. Catalyst slurry is removed from the reactor through outlet 16 and recycled via line 17 to the reactor. The hydrocarbon product mixture is removed from the reactor through line 18 and introduced into $BF_3$ stripper 19, from which $BF_3$ is removed as overhead through line 20 and recycled through line 21 to BF₃ tank 13. The remaining hydrocarbon product mixture is withdrawn from the BF₃ stripper through line 22. A portion of such hydrocarbon product mixture is introduced via lines 23 and 24 to fractionator 25. Unreacted isobutane is removed as overhead through line 26 and recycled through line 27 to the reactant feed stream line 10. Desired $C_5^+$ alkylate product is withdrawn from the bottom of fractionator 25 through line 28. Any normal butane may be withdrawn from the fractionator through line 29. The remaining portion of the hydrocarbon product mixture passing through line 22 from BF₃ stripper 19 is conducted through line 30 to depropanizer 31, from which propane is removed as overhead through line 32. Heavier components are removed as bottoms through line 33 and recycled via lines 34 and 24 to fractionator 25. Isobutane is removed from depropanizer 31 through line 35 and recycled through lines 36 and 27 to the initial reactant feed line 10.

A particularly effective system for carrying out the desired alkylation is a semi-continuous operation. It has, in accordance with this invention, been unexpectedly found that the aging rate of the macroreticular acid cation exchange resin/boron trifluoride used for the isoparaffin/olefin alkylation can be considerably reduced by means of a semicontinuous, rather than a continuous, operation. Thus, by way of comparison, semi-continuous isobutane/butene-2 alkylation utilizing the described catalyst produced an alkylate containing 47 percent trimethylpentanes (bromine number = 0.7) with a yield of 1.95 grams $C_5$–$C_{12}$/gram olefin converted after the catalyst had processed 109 grams hydrocarbon/gram resin (18.2 grams olefin converted/gram resin). In contrast, continuous isobutane/butene-2 alkylation with the identical resin/BF₃ catalyst under like conditions produced an alkylate which contained only 29 percent trimethylpentanes (bromine number was 5.9) with a yield of 1.3 gram $C_5$–$C_{12}$/gram olefin converted after the catalyst had processed 68.4 grams of hydrocarbon/gram resin (11.4 grams olefin converted/gram resin). Most noteworthy was the fact that the semi-continuous operation significantly reduced the aging rate of the catalyst. In carrying out the semi-continuous operation, the isoparaffin reactant is charged to the reactor, which contains the macroreticular resin. The required amount of BF₃, i.e., an amount in excess of that needed to saturate the resin, is then charged to the reactor. The resulting mixture is stirred for a suitable period of time, e.g., about 30 minutes, to insure good contact between the macroreticular acid cation exchange resin, isoparaffin and boron trifluoride. After such mixing period, the olefin reactant is charged continuously at a desired rate, e.g., 2.6 grams olefin/gram resin/hour. The alkylation reaction is then continued for a suitable period of time, e.g., about 1 hour, after which the reactor contents, excluding the macroreticular resin, are removed and the desired alkylate product separated therefrom. Then, the whole cycle is repeated.

Figure 3:
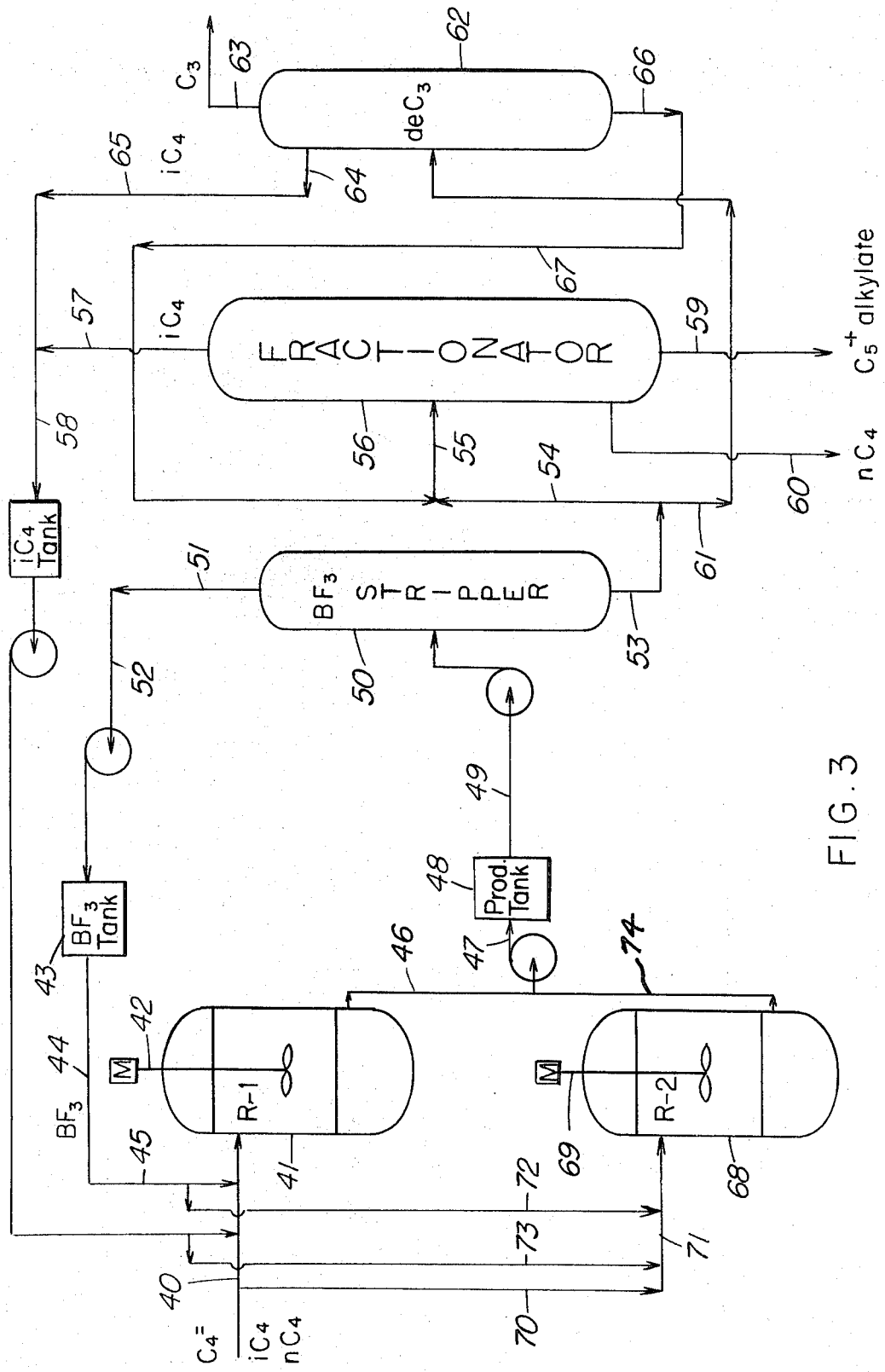
FIG. 3 illustrates a semi-continuous mode of operation.

A suitable system for carrying out the described semi-continuous method of operation is shown in FIG. 3. As in the case of FIG. 2, it will be realized that the semi-continuous method of operation shown should be considered to be schematic in nature since several items of processing equipment have beem omitted to simplify the illustrated operation. Turning now to FIG. 3, isobutane is introduced via line 40 to reactor 41 equipped stripper 50 wherein BF₃ is removed stirrer 42.

The macroreticular resin had previously been introduced into reactor 41. BF₃ is introduced into reactor 41 from tank 43 via lines 44 and 45. The resulting mixture is stirred to insure thorough mixing of the isobutane reactant, the macroreticular resin and BF₃. Thereafter, butenes are introduced through inlet line 40 to the reactor. After a suitable catalyst settling time, the hydrocarbon product mixture is withdrawn from the reactor through line 46 and introduced via line 47 to product tank 48. The mixture is then conducted via line 49 to BF₃ is removed as overhead through line 51 and recycled through line 52 to BF₃ tank 43. The bottoms product from BF₃ stripper 50 is removed via line 53. A portion of such mixture is conducted via lines 54 and 55 to fractionator 56. Isobutane is removed as overhead via line 57 and recycled through line 58 to inlet feed line 40. The $C_5^+$ alkylate product is withdrawn from bottoms fractionator 56 through line 59. Any normal butane is removed via line 60. Another portion of the hydrocarbon product mixture passing through line 53 from BF₃ stripper 50 is conducted via line 61 to depropanizer 62, from which propane is removed as overhead via line 63. Isobutane is removed from depropanizer 62 through line 64 and recycled via lines 65 and 58 to feed line 40. Higher boiling materials are removed from bottoms depropanizer 62 through line 66 and recycled via lines 67 and 55 to fractionator 56. A second reactor 68 also equipped with a stirrer 69 is operated in tandem with reactor 41 with the reactants being introduced via lines 70 and 71 and BF₃ being introduced via line 72 and isobutane recycle being introduced via line 73. The product from reactor 68 is removed via line 74 and conducted via line 47 to product tank 48, from which the operation is as described above. As noted, the dual reactor system in the described semi-continuous operation is operated in tandem utilizing suitable reactor cycles in each vessel. A suitable schedule for semi-continuous operation is shown below:

| | | | Step | |
|---|---|---|---|---|
| Step | | Time, min. | R-1 | R-2 |
| 1. | Charge with isobutane | 10 | 1 | 4 |
| 2. | Charge with BF₃ | 5 | 2 | 4 |
| 3. | Stir with resin | 30 | 3 | 4 |
| 4. | Charge olefin | 60 | 4 | 5,6,1,2,3 |
| 5. | Catalyst settling time | 8 | 5 | 4 |
| 6. | Drain hydrocarbon | 7 | 6 | 4 |

Figure 4:
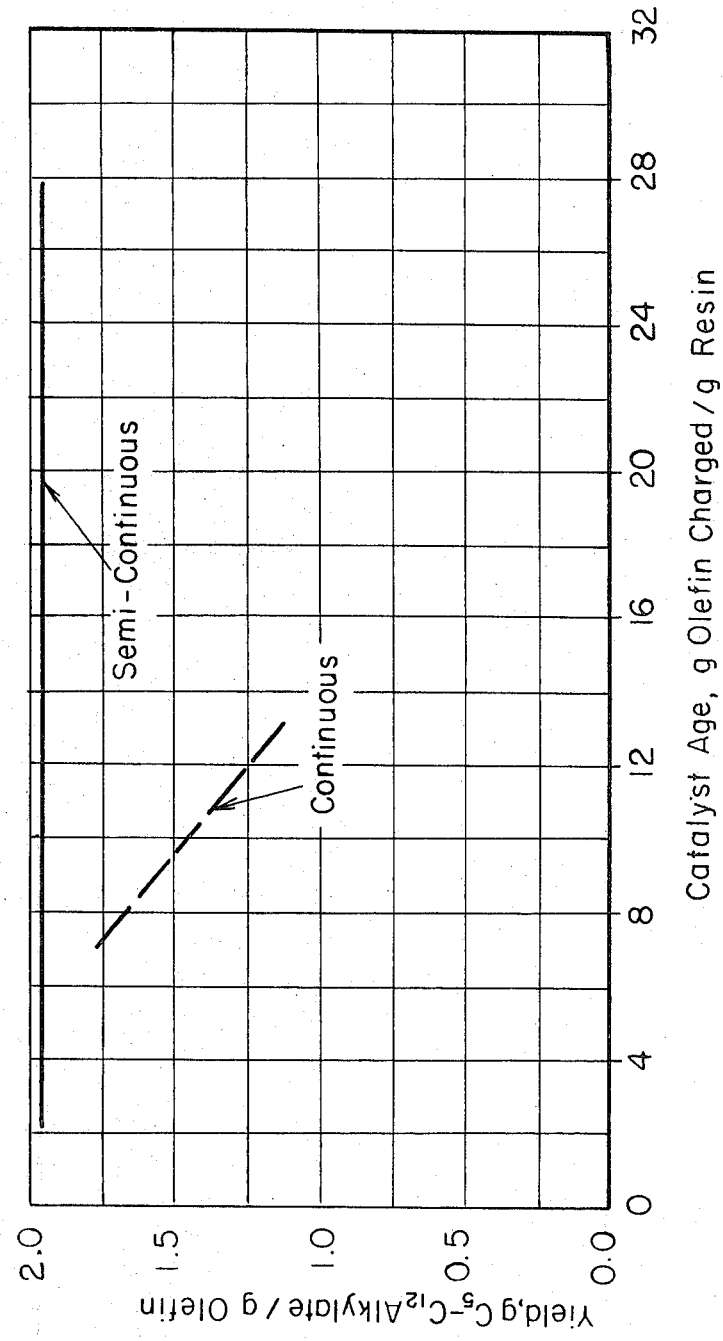
FIG. 4 depicts the relationship between yield of alkylate and catalyst age in a continuous and semi-continuous process.

Operation in a semi-continuous fashion has been found to result in an improvement in product quality and to reduce the aging rate of the catalyst as contrasted with a continuous manner of operation. The beneficial effect of semi-continuous operation on alkylate yield, compared with a continuous method of operation, is shown in FIG. 4. Referring to this figure, data are presented depicting the yield of $C_5$–$C_{12}$ alkylate/gram olefin as a function of catalyst age, gram olefin charge/gram resin. The data shown result from isobutane-butene-2 alkylation using Amberlyst XN-1010-/boron trifluoride catalyst at a temperature of 40°C. and utilizing an isobutane to butene-2 molar ratio of 5 to 1. It will be seen from FIG. 4 that semi-continuous operation produced an alkylate with a constant yield of 1.95 grams $C_5$–$C_{12}$/gram olefin (theoretically maximum yield is 2.03 gram $C_5^+$/gram olefin for isobutane/butene alkylation) for a catalyst age of 26 grams olefin charge/gram resin. This is to be contrasted with a continuous operation carried out under like conditions with like reactants and catalyst in which the $C_5$–$C_{12}$ yield dropped to 1.3 gram $C_5$–$C_{12}$/gram olefin as the catalyst aged to 11.4 grams olefin charge/gram resin.

Figure 5:
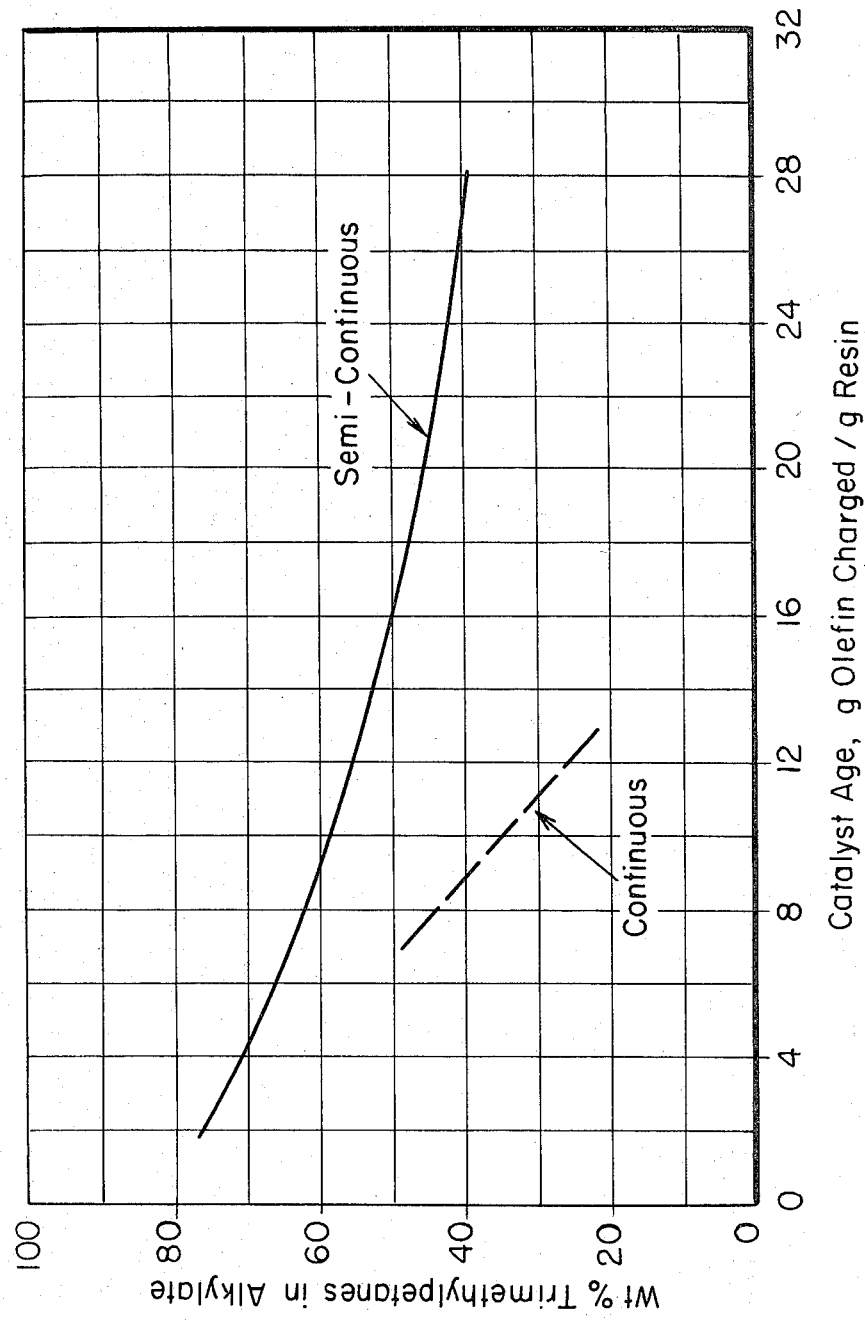
FIG. 5 depicts the relationship between quality of alkylate and catalyst age in a continuous and semi-continuous process.

The benefits of semi-continuous operation in terms of product quality utilizing the above reactants and the same process conditions are shown in FIG. 5. Semi-continuous operation affords production of higher quality alkylate (as determined by trimethylpentane content of alkylate) at all catalyst ages when compared with a continuous operation. Such is further substantiated by a comparison of bromine numbers. A low bromine number indicates alkylation while a high bromine number denotes polymerization. For semi-continuous operation, the product produced at a catalyst age of approximately 26 grams olefin/gram resin has a bromine number less than 0.7; whereas for continuous operation at a catalyst age of approximately 11 grams olefin/gram resin, the product produced during the entire course of operation had a bromine number of 5.9.

DESCRIPTION OF SPECIFIC EMBODIMENTS

The following examples will serve to illustrate the invention without limiting the same.

Examples 1 to 20 were carried out in a 300 ml. stainless steel stirred autoclave under pressure using a semi-batch type operation. In accordance with a standard procedure, 7 grams of macroreticular sulfonic acid ion exchange resin were placed in the reactor and 93 grams of isoparaffin, i.e., isobutane, were charged into the reactor under $N_2$ pressure. Then, about 6–7 grams of $BF_3$ gas were charged and the system was stirred at 1,800 R.P.M. After the desired temperature was reached, the olefin, i.e., butene, was fed in slowly during the duration of the run. An on-line chromatograph which was equipped with a flame-ionization detector and a digital integrator, was employed to monitor the course of alkylation.

At the end of the run, the product was discharged under a $N_2$ flow into a metal bomb which was kept at $-73°C$. The product was warmed to room temperature and transferred to the atmospheric pressure weathering system which consisted of two $BF_3$-scrubbers, a solenoid valve and a 10-liter gas collector which was equipped with an automatic pressure controller. Both the weathered liquid and the weathered gas were analyzed on a SCOT PAK column (100 feet × 0.02 inches) coated with squalane. The program used for the analysis was to hold the column at 45°C. for 6 minutes, then program to 120 °C. at 2°C./min. and held at 120 °C. until the analysis was completed. The weathered gas contained less than 2 percent and generally less than 1 percent of the total $C_5^+$ produced, depending on conditions and the particular resin used.

All octane ratings were determined using the mini-micro octane test unless otherwise specified. All octane numbers were determined clear. The RON of the weathered liquid was converted for the $C_4^-$ content to obtain the RON of $C_5^+$ in the weathered liquid. The $C_5^+$ yield is defined as weight of $C_5^+$ produced per unit weight of butene converted. The $C_5^+$ yield was calculated on the basis of the total weight of liquid collected at the end of each run.

Three different methods of pretreating the resins were used:

1. Method A: 220 grams of the dry resin were refluxed for 4 hours with 5 percent NaOH solution (1 liter), washed several times with water, soaked in 20 percent $H_2SO_4$ solution (1 liter) overnight with stirring, filtered, soaked for 15 minutes four times in 20 percent $H_2SO_4$ solution (500 ml. each time), filtered, washed with distilled water until pH matched that of distilled water, and finally rinsed with 500 ml. of acetone and 1 liter of water. The resulting resin was stored in water.

2. Method B: 50 grams of resin were washed chromatographically with methanol until the eluent was clear. The resin was further eluted with 3 liters of methanol at a flow rate of 12 cc/min., rinsed with 3 liters of water, then washed with 1.5 liters of 4 percent NaOH solution, rinsed with at least 5 liters of water at 30 cc/min., exchanged with 2 liters of 15 percent $H_2SO_4$ solution at a flow rate of 12 cc/min. and finally rinsed with a large amount of distilled water until free of acid. The resin was stored in water.

3. Method C: 50 grams of resin were washed chromatographically with methanol and toluene (separately in a number of repeated cycles) until the eluent was clear. The resin was then washed with water, rinsed with about 400 cc of 4 percent NaOH solution, washed with water and then exchanged with about 400 cc of 15 percent $H_2SO_4$ solution and finally rinsed with a large amount of distilled water until free of acid. The resin was stored in water.

While pretreatment of the resin was, in most cases, desirable and particularly the pretreatment of Method B, it is not considered essential, in every instance, to the success of the described alkylation process.

The pretreated resin was dried in vacuum for 3 hours at 120°C. prior to use. All resins were ground to pass through 100 mesh unless otherwise specified.

Detailed results are set forth in Table I below of a series of isobutane/trans-2-butene alkylation experiments using Amberlyst-15 alone, $BF_3$ alone, Amberlyst-15 with a trace of $BF_3$, Amberlyst-15/$BF_3$ in 1:1 complex form and Amerlyst-15/$BF_3$ with an excess of $BF_3$.

TABLE I

| Example No. Catalyst | 1 Amberlyst -15/$BF_3$ | 2 Reused Catalyst from Ex. 1 | 3 Reused Catalyst from Ex. 2 plus 6.8 g. $BF_3$ | 4 $BF_3$ only | 5 Amberlyst -15 only |
|---|---|---|---|---|---|
| Temperature, °C. | 40 | 40 | 40 | 40 | 40 |
| Pressure, psig | 161 | 160 | 255 | 230 | 160 |
| Reactor Mode | Semi-Batch | Semi-Batch | Semi-Batch | Semi-Batch | Semi-Batch |
| Run Duration, Hr. | 5 | 5 | 5 | 5 | 5 |
| Resin Pretreatment Method | C | C | C | C | C |
| Catalyst Loading: | | | | | |
|   Resin, gm | 13.9 | 13.9 | 13.9 | 0.0 | 13.0 |
|   $BF_3$, gm | 4.7 | <4.7 [1] | (<4.7)[1] + 6.8 | 4.0 | 0.0 |
| $C_4^-$ Space Velocity: | | | | | |
|   g$C_4^-$/g Resin/hr. | 0.18 | 0.18 | 0.18 | — | 0.19 |
| Wt. of H.C. Feed | | | | | |
|   i—$C_4$, gm | 93.0 | 93.0 | 93.0 | 93.0 | 93.0 |
|   2—$C_4^=$, gm | 12.36 | 12.36 | 12.36 | 12.36 | 12.36 |

TABLE I—Continued

| Example No. Catalyst | 1 Amberlyst −15/BF$_3$ | 2 Reused Catalyst from Ex. 1 | 3 Reused Catalyst from Ex. 2 plus 6.8 g. BF$_3$ | 4 BF$_3$ only | 5 Amberlyst −15 only |
|---|---|---|---|---|---|
| External i—C$_4$/C$_4$= Ratio[2] | 7.5 | 7.5 | 7.5 | 7.5 | 7.5 |
| gm Resin/gm—i—C$_4$ | 0.15 | 0.15 | 0.15 | — | 0.14 |
| Olefin Conversion, % | 100.0 | 99.95 | 100.0 | 96.92 | — |
| C$_5$+ Yield, gC$_5$+/gC$_4$=Conv. | 1.21 | 0.94 | 1.92 | 1.16 | — |
| Wt. % of C$_8$ in C$_5$+ | 56.55 | 42.30 | 79.15 | 47.87 | — |
| Bromine No. of Weathered Liq. | — | — | <0.1 | 25.53 | — |
| RON of C$_5$+ | — | — | 95.5 | — | — |
| C$_5$+ Paraffin Dist., mol % | | | | | |
| C$_9$+ | 19.53 | 37.02 | 6.35 | 18.35 | |
| C$_8$ | 54.75 | 43.47 | 76.29 | 44.61 | |
| C$_7$ | 5.94 | 4.22 | 4.48 | 8.60 | |
| C$_6$ | 7.20 | 6.02 | 4.41 | 11.13 | |
| C$_5$ | 12.58 | 9.14 | 8.47 | 17.31 | |
| C$_8$ Paraffin Dist., mol % | | | | | |
| Trimethylpentanes | 84.12 | 81.39 | 74.51 | 73.07 | |
| Dimethylhexanes | 15.85 | 18.02 | 24.61 | 26.40 | |
| Methylheptanes | 0.03 | 0.32 | 0.88 | 0.51 | |
| m-Octane | 0.0 | 0.27 | 0.0 | 0.02 | |

[1] Residual BF$_3$ in the used resin.
[2] The external i-C$_4$/C$_4$= ratio is defined as the ratio of isobutane to the total butene pumped during the course of the run.

The above results demonstrate that the macroreticular resin or BF$_3$ alone gave primarily undesired polymerization while a combination with excess BF$_3$ was an effective catalyst. The results of Example 3 further showed that the resin/BF$_3$ complex could be prepared in situ by mixing BF$_3$ and the resin in isobutane liquid for about an hour prior to feeding olefin into the reactor.

The effects of the amount of BF$_3$ and Na$^+$ on isobutane/trans-2-butene alkylation is shown by the results set forth in Table II below:

From the above it is seen that it is necessary to employ BF$_3$ in an amount in excess of that needed to saturate the resin. Particularly, this is evident from a comparison of the results of Examples 1, 3, 6 and 7 below:

| Example No. | 1 | 3 | 6 | 7 |
|---|---|---|---|---|
| Olefin Space Velocity | 0.18 | 0.18 | 2.6 | 2.6 |
| Equivalent Ratio of (total)* BF$_3$ to —SO$_3$H | 1.0 | 2.1 | 1.7 | 2.4 |
| Olefin Conversion, % | 100 | 100 | 99.2 | 100 |
| C$_5$+ Yield | 1.21 | 1.92 | 1.02 | 1.95 |

*Including BF$_3$ in the vapor phase, the liquid hydrocarbon phase and the resin.

TABLE II

| Example No. Catalyst | 6 Amberlyst 15/BF$_3$ | 7 Reused Catalyst from Ex. 6 plus 3.3 g. BF$_3$ | 8 Amberlyst-15 (Na$^+$ form)/BF$_3$ | 9 Amberlyst-15/ BF$_3$ (ultra dry) |
|---|---|---|---|---|
| Temperature, °C. | 40 | 40 | 40 | 40 |
| Pressure, psig | 175 | 210 | 190 | 240 |
| Reactor Mode | Semi-Batch | do. | do. | do. |
| Run Duration, Hr. | 1 | do. | do. | do. |
| Resin Pretreatment Method | C | do. | do. | do. |
| Catalyst Loading: | | | | |
| Resin, gm | 7.0 | (1) 7.0 | 7.0 | 7.0 |
| BF$_3$, gm | 3.9 | (<3.9)[1] + 3.3 | 6.3 | 6.9 |
| C$_4$=Space Velocity: | | | | |
| gC$_4$=/g Resin/Hr. | 2.6 | 2.6 | 2.6 | 2.6 |
| Wt. of H.C. Feed | | | | |
| i—C$_4$, gm | 93.0 | 93.0 | 93.0 | 93.0 |
| 2—C$_4$=, gm | 18.13 | 18.13 | 18.13 | 18.13 |
| External i—C$_4$/C$_4$=Ratio | 5.1 | 5.1 | 5.1 | 5.1 |
| gm Resin/gm—i—C$_4$ | 0.075 | 0.075 | 0.075 | 0.075 |
| Olefin Conversion, % | 99.2 | 100.0 | 100.0 | 100.0 |
| C$_5$+ Yield, gC$_5$+/gC$_4$=Conv. | 1.02 | 1.95 | 0.93 | 1.99 |
| Wt. % of C$_8$ in C$_5$+ | 49.98 | 54.75 | 36.03 | 56.16 |
| Bromine No. of Weathered Liq. | — | <0.1 | 41.1 | <0.1 |
| RON of C$_5$+ | — | 90.0 | — | 92.3 |
| C$_5$+ Paraffin Dist., mol % | | | | |
| C$_9$+ | 29.06 | 18.34 | 50.55 | 20.08 |
| C$_8$ | 50.25 | 52.38 | 39.25 | 54.55 |
| C$_7$ | 4.92 | 7.52 | 3.00 | 6.44 |
| C$_6$ | 6.58 | 8.20 | 3.30 | 7.37 |
| C$_5$ | 9.19 | 13.56 | 3.84 | 11.57 |
| C$_8$ Paraffin Dist., mol % | | | | |
| Trimethylpentanes | 81.27 | 74.19 | 80.96 | 75.72 |
| Dimethylhexanes | 18.73 | 25.17 | 19.04 | 23.63 |
| Methylheptanes | 0.0 | 0.64 | 0.0 | 0.65 |
| n-Octane | 0.0 | 0.0 | 0.0 | 0.0 |

[1] Residual BF$_3$ in the used resin.

The $C_5{}^+$ yields shown above indicate that alkylation activity dominates when the equivalent ratio of total $BF_3$ to $-SO_3H$ exceeds 2 but that polymerization predominates at equivalent ratios less than 2. Thus, an equivalent ratio of total $BF_3$ to $-SO_3H$, i.e., the acid group, of between 2 and 3 is desirably employed.

The necessary participation of $H^+$ in the desired alkylation is shown from the results of Examples 7 and 8. In the latter example, the sodium form of the macroreticular resin was used to determine if the $H^+$ on the $-SO_3H$ group was a necessary factor. The results of Examples 7 and 8 are condensed below:

| Example No. | 7 | 8 |
|---|---|---|
| Cation in Resin | $H^+$ | $Na^+$ |
| Olefin Conversion, % | 100 | 91 |
| $C_5{}^+$ Yield | 1.95 | 0.93 |

These comparative data establish that the acid group is essential for effecting the desired alkylation.

The results of using various macroreticular acid cation exchange resins, together with a microreticular resin, are summarized in Table III below:

surface acid concentration gave a lower $C_5{}^+$ yield, lower selectivity for trimethylpentane and a higher bromine number for the product denoting formation of unwanted olefinic products rather than desired alkylation.

Figure 6:
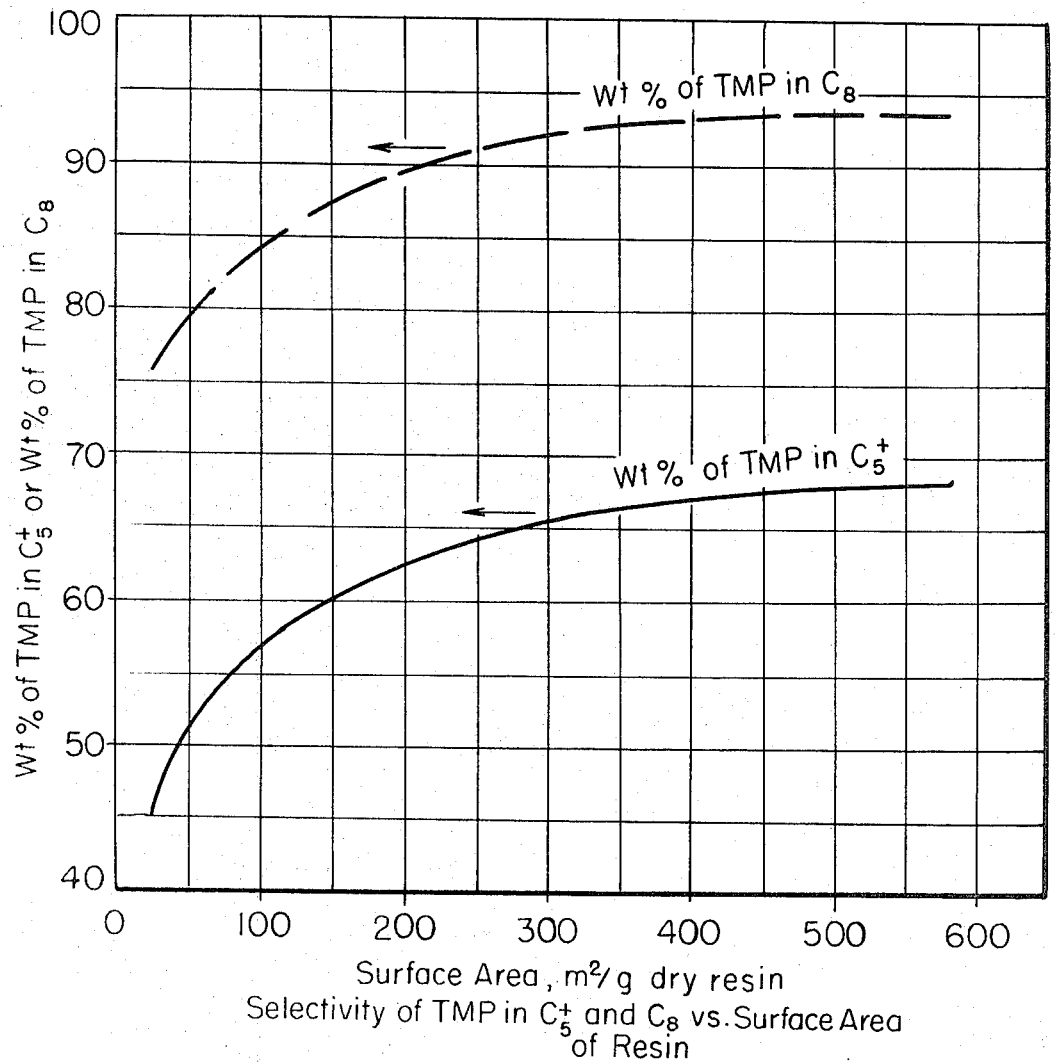
FIG. 6 depicts relationship between selectivity and surface area of resin.
Figure 7:
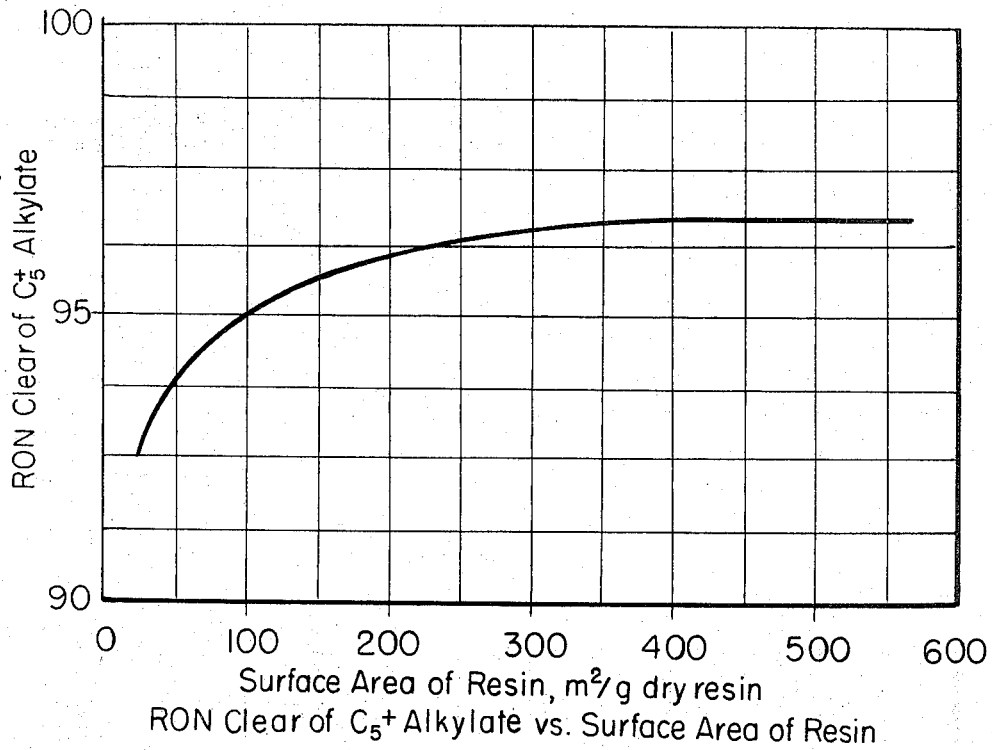
FIG. 7 depicts relationship between octane number and surface area of resin.

The effect of surface area of resin on the selectivity of trimethylpentane in $C_5{}^+$ and $C_8$ and the octane number of $C_5{}^+$ alkylate are depicted in FIG. 6 and FIG. 7. From these data, it will be seen that the surface area of the resin employed should desirably be above about 20 square meters per gram and generally between about 30 and 800 square meters per gram.

A series of experiments showing the effect of temperature was carried out. In these examples, isobutane/trans-2-butene alkylation over Amberlyst XN-1010/$BF_3$ catalyst was studied at 0°, 20°, 40° and 60°C. The results are summarized below:

| Example No. | 17 | 18 | 19 | 20 |
|---|---|---|---|---|
| Temperature, °C. | 0° | 20° | 40° | 60° |
| Wt. % of TMP in $C_5{}^+$ | 90.3 | 80.6 | 69.7 | 50.6 |
| Wt. % of TMP in $C_8$ | 97.1 | 93.5 | 88.3 | 77.5 |
| Wt. % of $C_9{}^+$ in $C_5{}^+$ | 4.2 | 9.2 | 11.6 | 20.7 |
| RON clear of $C_5{}^+$ alkylate | 101.9 | 99.1 | 96.5 | 96.0 |

As will be seen from the above, the selectivity for tri-

TABLE III

| Example No. | 10 | 11 | 12 | 13 | 14 | 15 | 16 |
|---|---|---|---|---|---|---|---|
| Catalyst | Amberlyst-15/$BF_3$ | Amberlyst-XN-1010/$BF_3$ | Amberlyst-XN-1008/$BF_3$ | Amberlyst-XN-1011/$BF_3$ | Amberlite-200/$BF_3$ | Amberlyst-XN-1005/$BF_3$ | Amberlite-IR-120H/$BF_3$ |
| Type | Macrorecticular | Macroreticular | Macroreticular | Macroreticular | Macroreticular | Macroreticular | Microrecticular |
| Temperature, °C. | 40 | 40 | 40 | 40 | 40 | 40 | 40 |
| Pressure, psig | 225 | 230 | 230 | 230 | 225 | 240 | 245 |
| Reactor Mode | Semi-Batch | do. | do. | do. | do. | do. | do. |
| Run Duration, Hr. | 1 | do. | do. | do. | do. | do. | do. |
| Resin Pretreatment Method | "B" | do. | do. | do. | do. | do. | do. |
| Catalyst Loading: | | | | | | | |
| Resin, gm | 7.0 | 7.0 | 7.0 | 7.0 | 7.0 | 7.0 | 7.0 |
| $BF_3$, gm | 6.7 | 6.9 | 6.2 | 6.2 | 6.9 | 6.3 | 6.8 |
| $C_4{}^=$ Space Velocity: | | | | | | | |
| $gC_4{}^=$/g Resin/Hr. | 2.6 | 2.6 | 2.6 | 2.6 | 2.6 | 2.6 | 2.6 |
| Wt. of H.C. Feed | | | | | | | |
| i—$C_4{}^=$, gm | 93.0 | 93.0 | 93.0 | 93.0 | 93.0 | 93.0 | 93.0 |
| 2—$C_4$, gm | 19.34 | 18.13 | 18.13 | 18.13 | 18.13 | 18.13 | 18.13 |
| External i—$C_4$/$C_4{}^=$ Ratio | 4.8 | 5.1 | 5.1 | 5.1 | 5.1 | 5.1 | 5.1 |
| gm Resin/gm—i—$C_4$ | 0.075 | 0.075 | 0.075 | 0.075 | 0.075 | 0.075 | 0.075 |
| Olefin Conversion, % | 100.0 | 100.0 | 100.0 | 100.0 | 100.0 | 100.0 | 100.0 |
| $C_5{}^+$ Yield, $gC_5{}^+$/$gC_4{}^=$ Conv. | 1.89 | 1.88 | 1.86 | 1.88 | 1.91 | 1.76 | 1.52 |
| Wt. % of $C_8$ in $C_5{}^+$ | 66.08 | 78.93 | 53.83 | 60.73 | 64.30 | 65.45 | 41.48 |
| Bromine No. of Weathered Liq. | <0.1 | <0.1 | 1.0 | 0.1 | 0.1 | 0.1 | 7.4 |
| RON of $C_5{}^+$ | 94.5 | 96.5 | 92.4 | 92.3 | 93.7 | 95.6 | 93.2 |
| $C_5{}^+$ Paraffin Dist., mol % | | | | | | | |
| $C_9{}^+$ | 15.55 | 9.49 | 17.53 | 15.49 | 17.96 | 16.81 | 33.07 |
| $C_8$ | 64.81 | 77.91 | 50.95 | 58.28 | 63.79 | 64.57 | 41.39 |
| $C_7$ | 5.36 | 3.85 | 8.00 | 6.97 | 5.66 | 4.95 | 6.29 |
| $C_6$ | 5.79 | 3.24 | 8.85 | 7.37 | 5.83 | 5.31 | 7.49 |
| $C_5$ | 8.49 | 5.51 | 14.66 | 11.89 | 6.76 | 8.36 | 11.77 |
| $C_8$ Paraffin Dist., mol % | | | | | | | |
| Trimethylpentanes | 79.06 | 88.33 | 73.12 | 75.52 | 80.87 | 86.39 | 77.00 |
| Dimethylhexanes | 20.46 | 11.67 | 26.11 | 23.78 | 18.74 | 13.61 | 22.36 |
| Methylheptanes | 0.48 | 0.0 | 0.78 | 0.70 | 0.39 | 0.0 | 0.60 |
| n-Octane | 0.0 | 0.0 | 0.0 | 0.0 | 0.0 | 0.0 | 0.03 |

It will be seen from the above data that the alkylate and octane number selectivities for trimethylpentane increase with increasing surface area of the resin employed. Amberlyst XN-1010 with the highest surface area and porosity, the smallest pore diameter and the lowest surface acid concentration was the most selective resin observed and produced the highest quality alkylate with a RON clear of 96.5. In marked contrast to the results obtained utilizing the macroreticular resin, the microreticular resin of extremely low surface area and porosity and possessing a very much larger methylpentane and the RON of $C_5{}^+$ alkylate increase sharply with decreasing temperature. An alkylate with a RON clear of 101.9 was produced at 0°C. and an olefin space velocity of 2.6.

Figure 8:
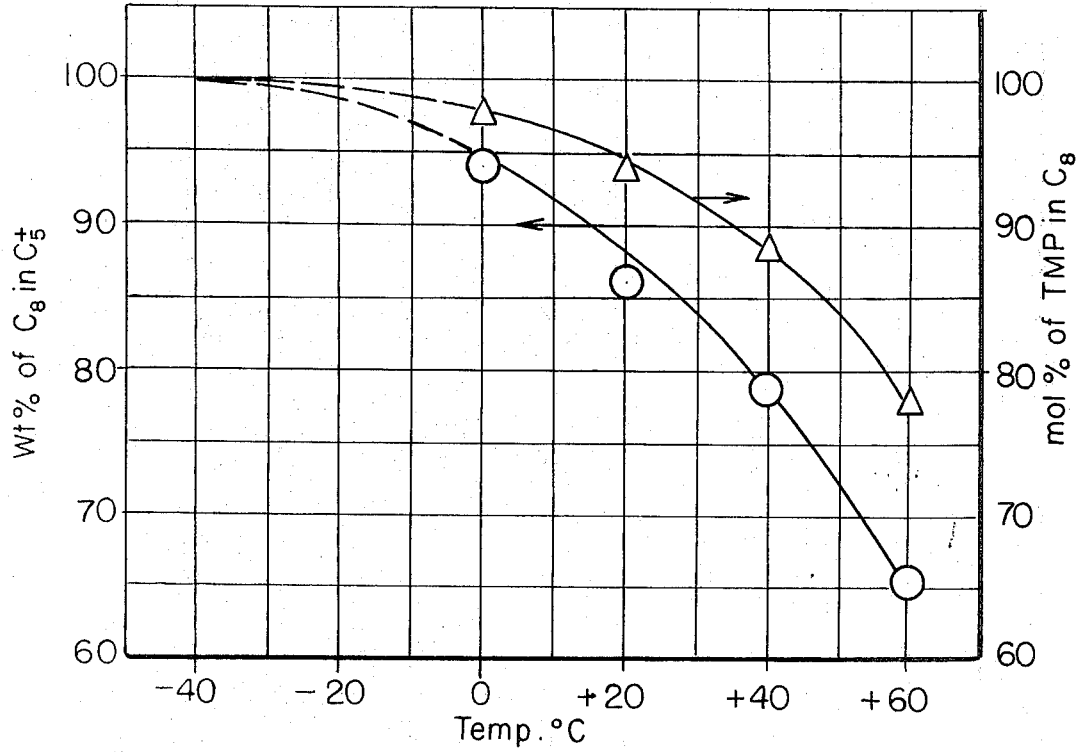
FIG. 8 depicts relationship between selectivity and temperature.
Figure 9:
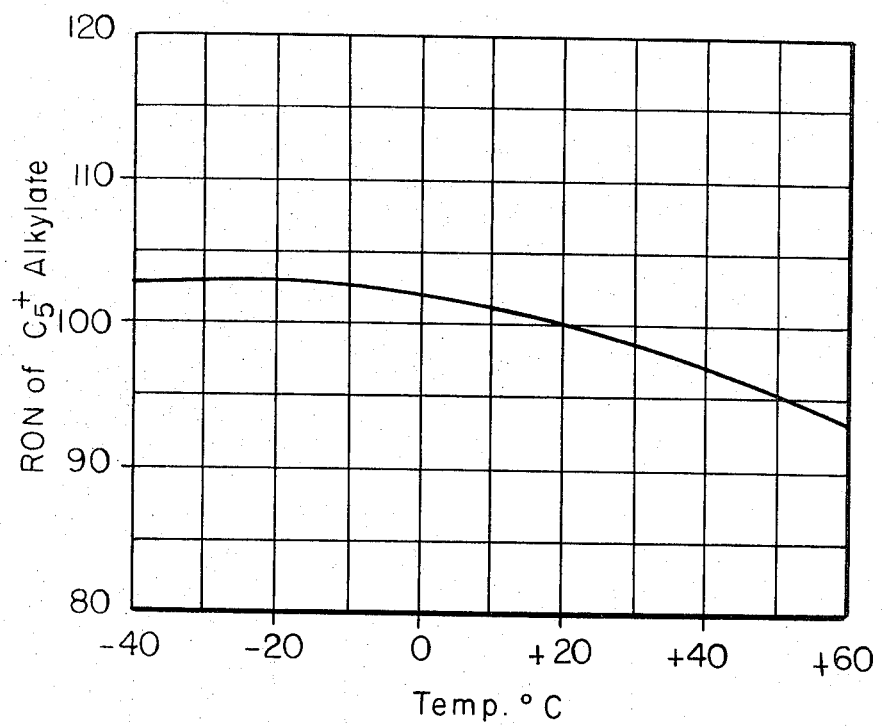
FIG. 9 depicts relationship between octane number and temperature.

The effect of temperature on weight percent of $C_8$ in $C_5{}^+$ and mole percent of trimethylpentane in $C_8$ are depicted in FIG. 8, while the effect of temperature on octane number of the $C_5{}^+$ alkylate is shown in FIG. 9. It is evident that temperatures in the lower range, between about −20°C. and about +20°C., overall are particularly preferred.

It is to be understood that the foregoing description is merely illustrative of preferred embodiments of the invention of which many variations may be made by those skilled in the art within the scope of the following claims without departing from the spirit thereof.

We claim:

1. In a process for alkylating an isoparaffin having from 4 to 8 carbon atoms with an olefin containing from 2 to 12 carbon atoms by contacting said isoparaffin and said olefin in the liquid state in an alkylation reaction zone maintained at a temperature between about −20° and 150°C. with a catalyst comprising a cation exchange resin containing acid groups and boron trifluoride, said boron trifluoride being present in said reaction zone in an amount in excess of that needed to saturate said resin to form the resin. $BF_3$ complex, the molar ratio of said isoparaffin to said olefin being between about 2 and 50, withdrawing a hydrocarbon product mixture from said reaction zone and separating an alkylate hydrocarbon product from said mixture, the improvement wherein said resin consists essentially of a macroreticular acid cation exchange resin characterized by a water content between about 0.5 and about 20 weight percent, a surface area of at least 30 square meters per gram and a surface acid concentration of between 0.001 and about 0.5 milliequivalents of hydrogen ion per square meter surface area.

2. The process of claim 1 wherein said temperature is between about −20° and 60°C.

3. The process of claim 1 wherein said surface acid concentration is between 0.001 and 0.2 milliequivalents of hydrogen ion per square meter surface area.

4. The process of claim 1 wherein said resin consists essentially of a macroreticular sulfonic acid cation exchange resin.

5. The process of claim 1 wherein said catalyst is characterized by an equivalent ratio of $BF_3$ to acid groups in said complex which exceeds 2.

6. The process of claim 1 wherein said olefin contains 4 carbon atoms.

7. The process of claim 1 wherein said isoparaffin is isobutane.

8. The process of claim 1 wherein said molar ratio of isoparaffin to olefin is between about 3 and about 10.

9. The process of claim 4 wherein said macroreticular sulfonic acid cation exchange resin is a sulfonated styrenedivinylbenzene copolymer.

10. The process of claim 4 wherein said macroreticular sulfonic acid cation exchange resin has a surface area of between about 30 and about 800 square meters per gram.

11. A process for alkylating an isoparaffin having from 4 to 8 carbon atoms with an olefin containing from 2 to 12 carbon atoms which comprises introducing said isoparaffin into an alkylation reaction zone containing a macroreticular acid cation exchange resin containing acid groups and characterized by a water content between about 0.5 and about 20 weight percent, a surface area of at least 30 square meters per gram and a surface acid concentration of between 0.001 and about 0.5 milliequivalents of hydrogen ion per square meter surface area, introducing boron trifluoride into said reaction zone in an amount in excess of that needed to saturate said resin to form the resin: $BF_3$ complex, stirring the resulting mixture at a sufficient rate and for a sufficient period of time to insure good contact between said isoparaffin, said resin and said boron trifluoride, thereafter charging said olefin to said reaction zone in an amount such taht the molar ratio of said isoparaffin to said olefin is between about 2 and about 50 and effecting alkylation at a temperature between about −20° and about 150°C. under sufficient pressure to maintain the reactants and product in the liquid state, withdrawing the resulting hydrocarbon product mixture from said reaction zone and separating an alkylate hydrocarbon product from said mixture.

12. The process of claim 11 wherein said temperature is between about −20°C. and 60°C.

13. The process of claim 11 wherein said surface acid concentration is between 0.001 and 0.2 milliequivalents of hydrogen ion per square meter surface area.

14. The process of claim 11 wherein said resin consists essentially of a macroreticular sulfonic acid cation exchange resin.

15. The process of claim 11 wherein the equivalent ratio of boron trifluoride to acid groups in said complex exceeds 2.

16. The process of claim 11 wherein said olefin contains 4 carbon atoms.

17. The process of claim 11 wherein said isoparaffin is isobutane.

18. The process of claim 11 wherein said molar ratio of isoparaffin to olefin is between about 3 and about 10.

19. The process of claim 14 wherein said macroreticular sulfonic acid cation exchange resin is a sulfonated styrene-divinylbenzene copolymer.

20. The process of claim 14 wherein said macroreticular sulfonic acid cation exchange resin has a surface area of between about 30 and about 800 square meters per gram.

* * * * *

UNITED STATES PATENT AND TRADEMARK OFFICE
CERTIFICATE OF CORRECTION

PATENT NO. : 3,855,342
DATED : December 17, 1974
INVENTOR(S) : TRACY J. HUANG and SERGEI YURCHAK It is certified that error appears in the above-identified patent and that said Letters Patent are hereby corrected as shown below:

Column 1, Table Under Amberlyst-XN-1005, line 7, "100-200" should be -- 100-120 --.

Column 5, line 68, "stripper 50 wherein BF3 is removed" should be -- with a stirrer 42 --.

Column 8, line 53, "Amerlyst-15/BF$_3$" should be -- Amberlyst-15/BF$_3$ --.

Table I, last line, "m-Octane" should be -- n-Octane --.

Column 14, Claim 11, line 18, "taht" should be -- that --.

Signed and Sealed this fourth Day of November 1975

[SEAL]

Attest:

RUTH C. MASON
*Attesting Officer*

C. MARSHALL DANN
*Commissioner of Patents and Trademarks*